(12) United States Patent
McCammon et al.

(10) Patent No.: US 7,606,797 B2
(45) Date of Patent: Oct. 20, 2009

(54) REVERSE VALUE ATTRIBUTE EXTRACTION

(75) Inventors: Keiron McCammon, Danville, CA (US); Manish Chandra, Fremont, CA (US)

(73) Assignee: Kaboodle, Inc., Sunnyvale, CA (US)

( * ) Notice: Subject to any disclaimer, the term of this patent is extended or adjusted under 35 U.S.C. 154(b) by 294 days.

(21) Appl. No.: 11/357,289

(22) Filed: Feb. 16, 2006

(65) Prior Publication Data

US 2006/0190684 A1    Aug. 24, 2006

Related U.S. Application Data

(60) Provisional application No. 60/656,040, filed on Feb. 24, 2005.

(51) Int. Cl.
*G06F 17/30* (2006.01)
(52) U.S. Cl. .................. 707/5; 707/4; 707/6; 707/7
(58) Field of Classification Search .............. None
See application file for complete search history.

(56) References Cited

U.S. PATENT DOCUMENTS

| | | | |
|---|---|---|---|
| 6,606,659 B1 * | 8/2003 | Hegli et al. | 709/225 |
| 6,947,985 B2 * | 9/2005 | Hegli et al. | 709/224 |
| 2002/0091671 A1 * | 7/2002 | Prokoph | 707/1 |
| 2005/0131896 A1 * | 6/2005 | Cao et al. | 707/6 |
| 2005/0289452 A1 | 12/2005 | Kashi et al. | |

* cited by examiner

*Primary Examiner*—Jean M Corrielus
*Assistant Examiner*—Loan T Nguyen
(74) *Attorney, Agent, or Firm*—Brill Law Office; Jeffrey Brill

(57) ABSTRACT

An attribute manager extracts attribute values from formatted data. The attribute manager maintains information concerning a plurality of attributes, such as matching names and values for attributes. Formatted data is parsed into a plurality of elements comprising a canonical representation of the data, independent of the data format. The formatted data can be, for example, a web page, a portable document format document or a word processor document. The attribute manager scans the elements for occurrences of attribute values. Based upon value occurrence distribution and frequency within the data, and maintained information concerning attributes, the attribute manager infers occurrence of specific attributes in the formatted data and assigns the most appropriate occurring values to the specific attributes. In some embodiments, the attribute manager stores attributes and their assigned values, and uses this information to automatically prepare summaries of input data.

17 Claims, 3 Drawing Sheets

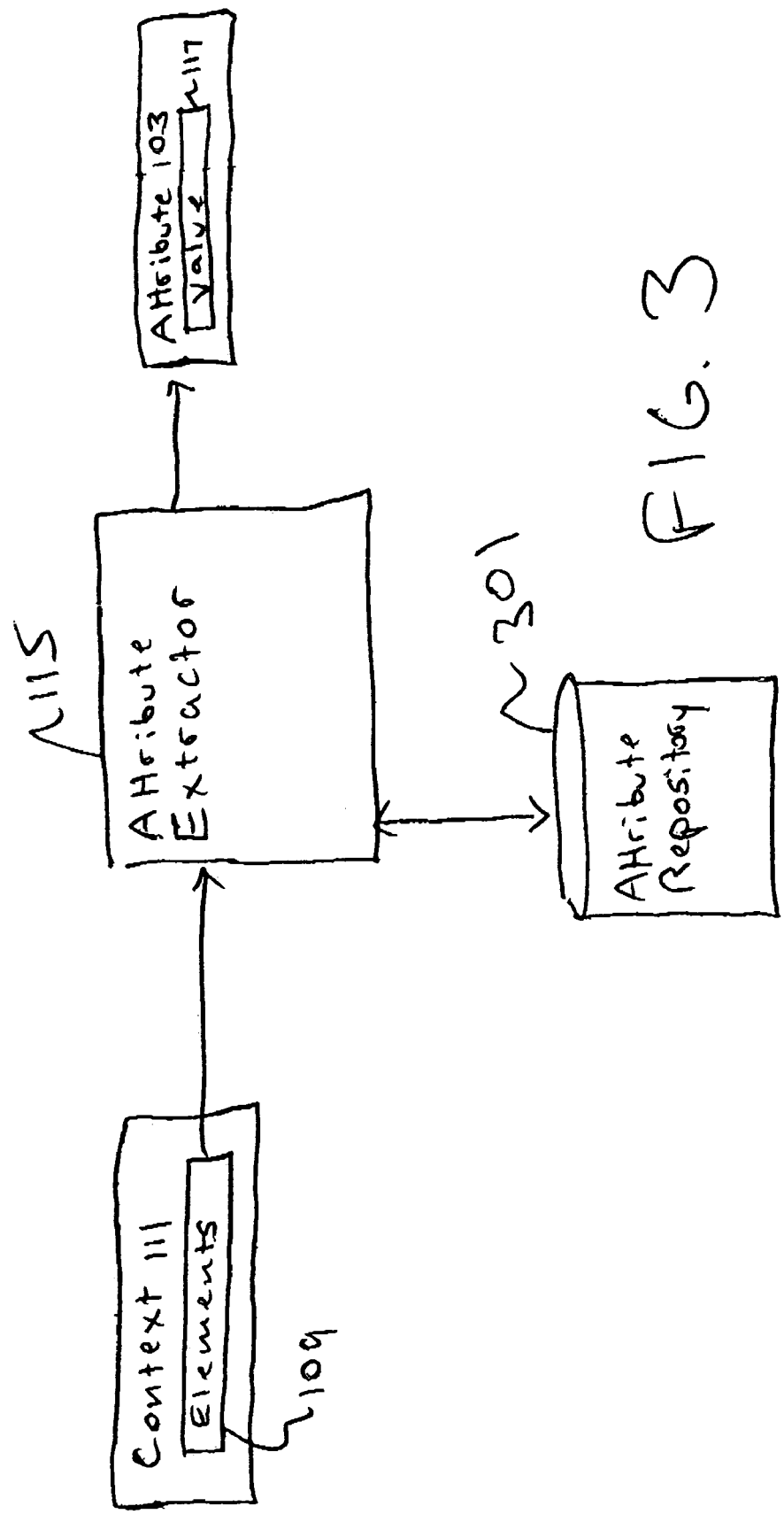

REVERSE VALUE ATTRIBUTE EXTRACTION

PRIORITY CLAIM AND RELATED APPLICATION

This patent application claims the benefit of provisional application Ser. No. 60/656,040, titled "Unique Reverse Attribute VaLue Extraction System. (UNRAVL) and Web Information Extraction," filed on Feb. 24, 2005, the entirety of which is hereby incorporated by reference. This patent application is related to co-pending utility application Ser. No. 11/357,656, titled "Extracting Information from Formatted Sources," filed on Feb. 16, 2006, and having the same assignee.

TECHNICAL FIELD

This invention pertains generally to automatically extracting attributes from data, and more specifically to automatically identifying attribute values in formatted data, regardless of the specific data format.

BACKGROUND

While systems exist today for enabling users to store information from a variety of sources into a standard repository, these systems are limited in that they can only extract and summarize explicitly available information, e.g., file creation date, web page uniform resource locator (URL), source website, type of document, etc. Any additional information generally must be manually entered by the user, creating a massive data entry burden.

With the increasing commercial importance of the Internet, it is becoming more and more important to be able to reliably extract information from any web page. Because the Internet is extremely broad, it contains web pages in a wide variety of domains, and having a wide variety of structures. Information extraction tools should be able to extract information from any web page in which a user may be interested.

For example, a new area of personal web creation (social bookmarking) has recently emerged. The systems in this area typically store a pointer to a web page with a local cached copy of the web page. The limited information stored in this format is significantly less useful than would be relevant features automatically extracted from web pages of interest to the user, which could be, e.g., automatically summarized and compared.

What is needed are methods, systems and computer readable media that allow automatic extraction of attributes from any formatted data source. The information should be extracted in a general way, such that it can be stored, and used to, e.g., form a summary of the data source. The extraction technique should not be restricted to web pages, but should be applicable to any formatted input, regardless of the format.

SUMMARY OF INVENTION

Computer-implemented methods, computer systems and computer-readable media extract attribute values from formatted data. An attribute manager maintains information concerning a plurality of attributes, such as matching names and values for attributes. Formatted data is parsed into a plurality of elements comprising a canonical representation of the data, independent of the data format. The formatted data can be, for example, a web page, a portable document format document or a word processor document. The attribute manager scans the elements for occurrences of attribute values. Based upon value occurrence distribution and frequency within the data, and maintained information concerning attributes, the attribute manager infers occurrence of specific attributes in the formatted data and assigns the most appropriate occurring values to the specific attributes. In some embodiments, the attribute manager stores attributes and their assigned values, and uses this information to automatically prepare summaries of input data.

The features and advantages described in this summary and in the following detailed description are not all-inclusive, and particularly, many additional features and advantages will be apparent to one of ordinary skill in the relevant art in view of the drawing, specification,. and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3 is a block diagram illustrating the operation of an attribute extractor, according to some embodiments of the present invention.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
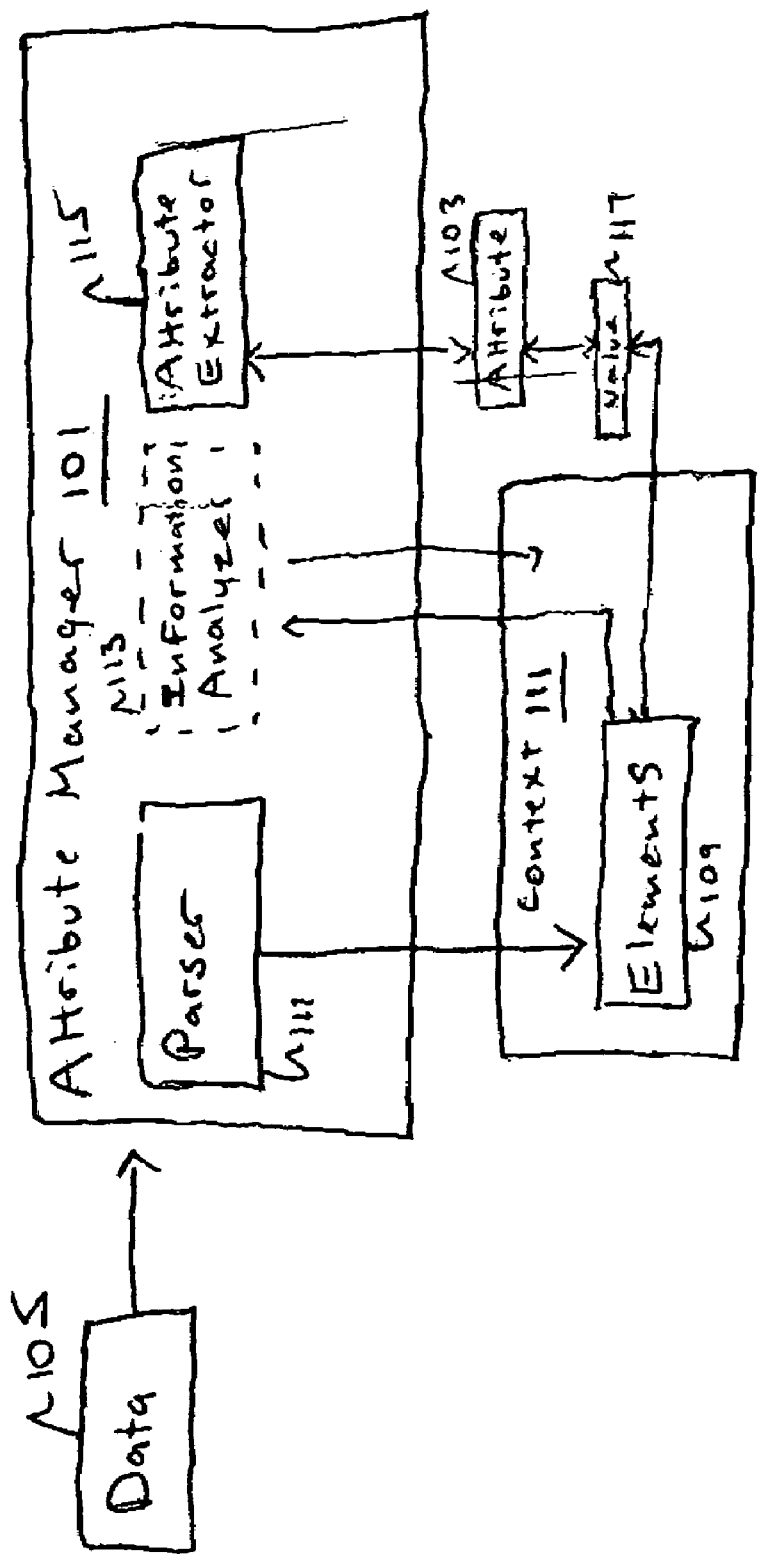
FIG. 1 is a block diagram illustrating a high level overview of an attribute manager extracting attributes from formatted data, according to some embodiments of the present invention.

FIG. 1 illustrates an attribute manager 101, according to some embodiments of the present invention. it is to be understood that although the attribute manager 101 is illustrated as a single entity, as the term is used herein an attribute manager 101 refers to a collection of functionalities which can be implemented as software, hardware, firmware or any combination of these. Where an attribute manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the attribute manager 101 extracts attributes 103 from formatted data 105. The formatted data 105 often comprises a web page, but can also be in other forms, such as a file in Portable Document Format (PDF), a word processor document, or other types of formatted information.

A parser 107 parses the data 105 into a canonical form, for example an array of elements 109. Each element 109 represents a segment of the data 105, such as text, an image, a multi-media object (audio, video or other non-textual objects) or other such object contained within the data. In some embodiments, the array of elements 109 is added to a context 111, which contains shared information about the data 105, and is utilized by subsequent steps of the process as explained below. Of course, the use of an array to hold elements 109, and the use of a context 111 to share information between process steps are variable design choices. Other mechanisms can be utilized to instantiate this functionality, and various implementation alternatives will be readily apparent to those of ordinary skill in the relevant art in light of this specification.

In any case, the parser 107 takes the data 105 and distills it into a canonical representation that is independent of its format type (a web page, a PDF document or a word processor document, for example). This allows later steps to operate independently of the type of the data 105 which was originally received by the attribute manager 101. This canonical representation reflects the salient information from the data 105 that is relevant for analysis and extraction.

Often much of the content within a formatted document is non-substantive markup (specific to the type of document), that is used by a browser or document viewer to render it. The parser 107 removes this irrelevant markup, and creates elements 109 for contiguous units of text (which might be a single word, line of text, sentence or paragraph); images; multi-media objects and other such content.

In the case of a web page that consists of HTML (or XHTML) markup, the parser 107 parses the web page and creates elements 109 for the text, images and multi-media objects contained within the markup indicators.

For text, markup symbols that denote text formatting (such as <bold>, <i>, and so on) do not result in elements 109 being created. Instead, text within the markup indicators is aggregated together until a non-formatting symbol is reached (such as <p>or <div>). The goal here is to reduce the data 105 to the smallest number of elements 109, each representing a contiguous section of text within the data 105.

Figure 2:
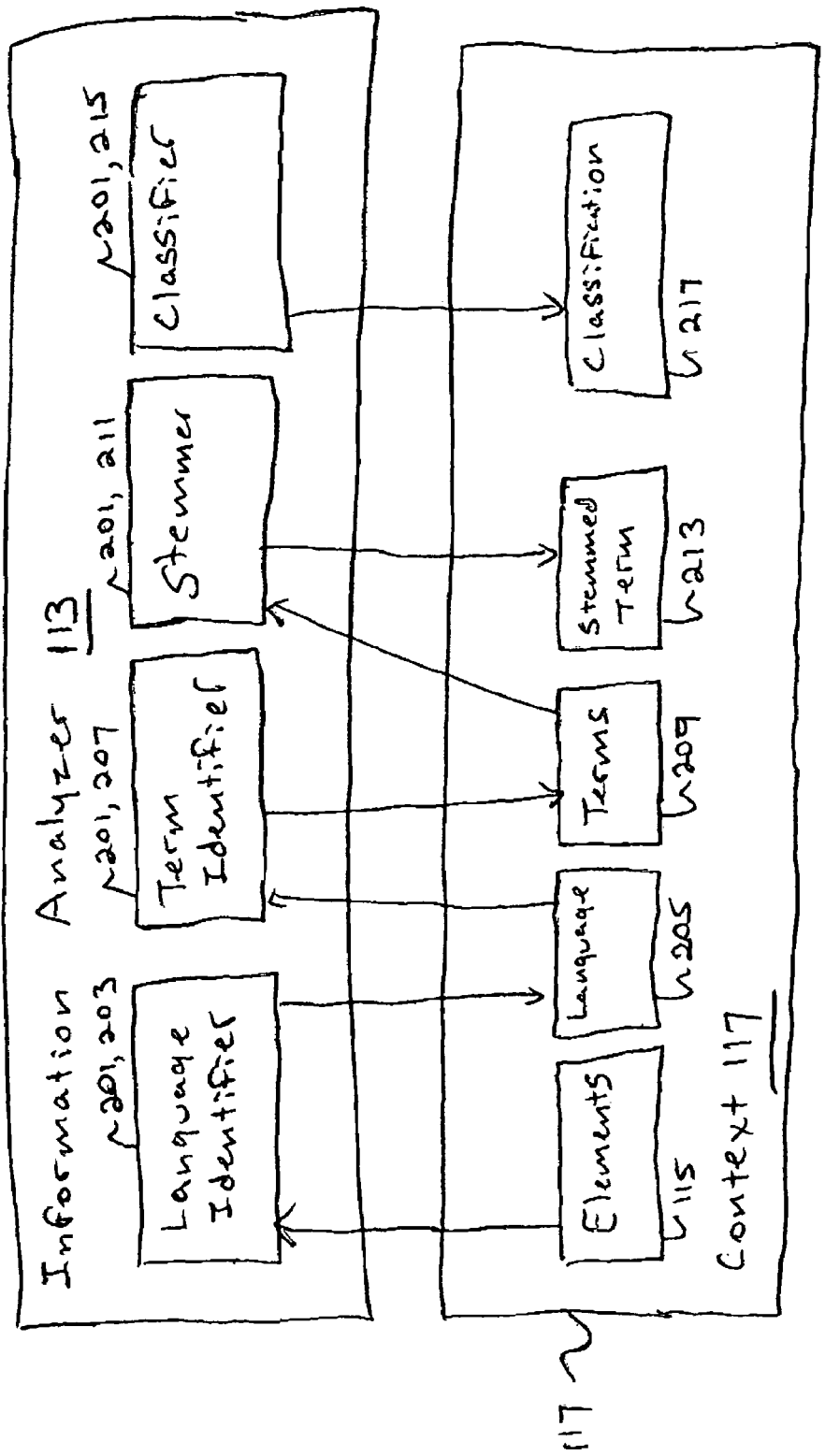
FIG. 2 is a block diagram illustrating the operation of an information analyzer, according to some embodiments of the present invention.

In some embodiments of the present invention, the context 111 is analyzed by an information analyzer 113, which adds additional information about the data 111. Turning now to FIG. 2, the information analyzer 113 is illustrated in greater detail according to one embodiment of the present invention. The information analyzer 113 comprises one or more analysis components 201, which are typically executed in a pre-defined order. Each analysis component 201 analyzes the information already within the context 111, in order to either extend it and/or add new information. The purpose of an analysis component 201 is to add contextual information about , the data 105 to the context 111. As an example, a language identifier 203 (a specific example of an analysis component 201) can identify the language 205 in which the data 105 is composed, and add this to the context 111, so that other analysis components 201 further down the workflow can use this information in their analysis of the data 105 (that is to say, by knowing the language 205 in which the input is written, other analysis components 201 can then further analyze it in ways it otherwise could not).

As illustrated in FIG. 2, the information analyzer 113 can consist of multiple analysis components 201 that extend and add to the known information about the data 105. In one embodiment, one analysis component 201 can utilize the output of a previous component 201, such that the plurality of components 201 form a workflow that defines their order of execution.

As noted above, an analysis component 201 can create new information about the data 105 (e.g., in the case of the language identifier 203 described above, an identification of the language 205 of the data 105), or extend existing information about the data 105. For example, a term identifier 207 can create an array of terms 209 for the text in each element 109, and a stemmer 211 can convert each such term 209 to its root linguistic form (stem) 213. Another example of an analysis component is a classifier 215, which creates a content or subject classification 217 for the data 105. It is to be understood that the analysis components 201 illustrated in FIG. 2 are non-exhaustive examples. Other types of analysis can be performed to add information to the context 111 or extend information therein, and other examples of analysis components 201 will be readily apparent to those of ordinary skill in the relevant art in light of this specification.

Returning to FIG. 1, after the analysis is complete, an attribute extractor 115 extracts attributes 103 with assigned values 115 from the context 111. This functionality is illustrated in greater detail in FIG. 3. As illustrated, the attribute extractor 115 scans the elements 109 for occurrences of known attribute values 117. The extraction manager 101 maintains information concerning attributes 103 in an attribute repository 301, which is read by the attribute extractor 115 to glean relevant information concerning attributes 103 and attribute values 117. In one embodiment of the present invention, the attribute repository defines the set of known values 117 for each attribute 103 $a_1$ through $a_n$.

It is to be understood that an attribute 103 within the context herein can comprise any entity for which a finite set of values 117 can be assigned. An attribute 103 can be denoted by one or more names, and the names and values 117 that can match a given attribute 103 are typically stored in the attribute repository 301. For example, an attribute 103 denoting color could be identified by the names "color," "hue," "shade" or "tint," and the value 117 of that attribute could be "red," "blue," "green," etc. A set of attributes 103 can be associated with a type or classification of data 105. For example, data 105 such as web pages describing shirts could be associated with the attributes 103 color, style, size, pattern, price, picture, description, etc. An attribute value 117 can be, e.g., a discrete value 117, (like "Mahogany", "Walnut" or "Cherry") or a regular expression, (like "\d[mp|megapixels]"). Some values 117 can match more than one attribute 103. Default attributes 103, along with their matching names and values 117 as well as any additional information, can be supplied with the system. In some embodiments, the attribute repository 301 can be edited by users and/or administrators, or revised automatically according to how the system is utilized.

The attribute extractor 115 infers the occurrence of specific attributes 103 in the data 105 and assigns the most appropriate values 117 occurring in the data 105 to those attributes 103. The attribute extractor 115 does this based on the distribution and frequency with which attribute values 117 occur within the data 105, and information concerning attributes 103 in the attribute repository 301.

For example, after scanning the data 105 for occurrences of attribute values 117, the attribute extractor 115 can calculate occurrence distribution and frequency statistics for values 117 such as: for each value 117 that occurs in the data 105, the number of attributes 103 for which that value 117 can be a match, and the number of occurrences of that value 117 in the data 105; and for each element 109, the number of occurrences of values 117 occurring in that element 109 that represent distinct attributes 103, and the number of occurrences of matching values 117 in that element 109 for each of a set of attributes 103.

The attribute extractor 115 can use these statistics in combination with the information in the attribute repository 301 to determine which attributes 103 occur in the data 105, and what their values 117 are. More specifically, in one embodiment the attribute extractor 115 ranks each element 109 based on how many distinct attributes 103 occur in that element 109. Then, for each of a set of attributes 103, the attribute extractor 115 ranks each matching value 117 for that attribute 103 based on the highest ranking of an element 109 in which that value 117 occurs, and on whether that value 117 occurs in the data 105 in proximity (e.g., in the same element 109) as an occurrence of a matching name of that attribute 103. Then, for each of the attribute values 117 that occur in the data 105, the attribute extractor 115 infers the occurrence in the data 105 of the attribute 103 for which that value 117 has the highest ranking, and assigns that value 117 to that attribute 103.

Describing a specific embodiment at a formulaic level of detail, in one embodiment the attribute extractor 115 scans each element 109, $E=\{e_1 \ldots e_n\}$, for known attribute values 117. This results in a set of found values 117, $V=\{v_1 \ldots v_n\}$, each value 117 being a match for one or more attributes 103, $A=\{a_1 \ldots a_n\}$, as defined by the attribute repository 301.

For each v in V:
The number of attributes 103 that a given value 117 matches (the value's 117 attribute frequency) is represented by $v_iaf$.
The number of occurrences of a given value 117 in the data 105 (the value's 117 overall frequency) is represented by $v_if$.

For each a in A:
The set of values 117 that match a given attribute 103 is represented by $A_iV=\{a_iv1 \ldots a_ivn\}$.
The number of values 117 occurring in the data 105 that match a given attribute 103 (the attribute's 103 frequency) is represented by $a_ivf$.

For each e in E:
The set of attributes 103 found in each element 109 is represented by $EA=\{e_ia_1 \ldots e_ia_n\}$.
The number of values 117 occurring in a given element 109 that represent distinct attributes 103 (the element's 109 attribute frequency), is represented by $e_iaf$. For example, if an element 109 contains values $v_1$ and $v_2$, where $v_1$ matches attributes $a_1$ and $a_2$ and $v_2$ matches $a_3$, then the attribute frequency for that element 109 would be two.
The number of values 117 occurring in a given element 109 matching an attribute 103 (the attribute's 103 value frequency), is represented by $e_ia_jvf$.

For each e in E:
If $e_iaf$ is greater than one, $e_i$ is assigned a score, $es_i$:

$$es_i=e_iaf/\max(eaf)$$

For each a in A:
For each $a_iv$ in $A_iV$:
Assign a score, $a_iv_js$, for the value 117 for the attribute 103, which is the maximum score, $es_i$, of the elements 109 that contain $v_j$.
For the set of elements 109 that contain the value $a_iv_j$, scan each for an occurrence of a name of that attribute 103 (as defined in the attribute repository 301). If a name is found in an element 109, then the score of the value for the attribute, $a_iv_js$, is increased by a pre-determined increment.

For each v in V:
Assign the attribute $a_i$ the value $v_j$, where $a_iv_js$ is maximized for $a_i$.

It is to be understood that the above described embodiment specific implementation examples are not exhaustive, and in other embodiments different criteria and weights can be applied in order to infer the occurrence of specific attributes 103 in the data 105, and assign the most appropriate values 117 thereto. Other implementation variations will be readily apparent to those of ordinary skill in the relevant art, in light of this specification, and are within the scope of the present invention.

The present invention can be used by itself or in conjunction with the invention of the "Extracting Information from Formatted Sources" patent application to enable users to collect, organize and share interesting information they find in any formatted source, including any web page. The extracted information can, for example, form a summary of an input source.

In light of the present description, computer-readable media are understood to constitute data storage elements such as computer memory and mass storage devices. Computer memory may constitute any type of memory suitable for recording computer program code therein, including at least: read-only memory (ROM), volatile memory, such as random-access memory (RAM) and buffer memory. Mass storage devices may constitute any type of fixed storage device, such as a disk drive, and removable storage devices such as compact discs (CD's). Computer-readable media also are understood to constitute any type of data storage element or data container known now or in the future to persons of ordinary skill in the relevant arts.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for extracting attribute values from formatted data, the method comprising the steps of:

maintaining, by a computer, an attribute repository containing information concerning a plurality of attributes, wherein an attribute comprises an entity for which any of a plurality of values to which is assigned one from a finite group of values, and wherein the information concerning each attribute comprises at least one matching attribute name and at least one matching value for that attribute;

parsing formatted data and creating a plurality of elements, by a computer, each element representing a segment of the data, comprising a canonical representation of the data, independent of the data format, said canonical representation comprising a sequence at least of text elements, each text element representing a contiguous unit of text from said formatted data, wherein said canonical representation excludes non-substantive content;

scanning, by a computer, the elements of the plurality for occurrences of attribute values;

ranking, by a computer, each element based on how many distinct attributes occur in that element;

for each of a plurality of attributes, ranking, by a computer, each matching value for that attribute based on the highest ranking of an element in which that value occurs, and on an occurrence of that value in the same element as an occurrence of a matching name of that attribute;

for each of a plurality of values occurring in the formatted data, inferring, by a computer, occurrence in the formatted data of the attribute for which that value has the highest ranking, and assigning that value to that attribute; and preparing a summary of the data, using at least one attribute inferred to occur in the data and an assigned value of said at least one attribute, by a computer.

2. The method of claim 1, further comprising: analyzing, by a computer, at least some of the elements of the plurality in order to glean additional information concerning the formatted data.

3. The method of claim 2, wherein analyzing, by a computer, at least some of the elements of the plurality in order to glean additional information concerning the formatted data further comprises:

performing, by a computer, a series of analysis steps in an order, said performing involving output from an earlier analysis step being used as input to a later analysis step.

4. The method of claim 1, further comprising calculating value occurrence distribution and frequency within the data by performing, by a computer, at least one step from a group of steps consisting of:

for each value occurring in the data, determining a number of attributes for which the value comprises a match;

for each value occurring in the data, calculating a number of occurrences of the value in the data;

for each element of the plurality, determining a number of occurring values, said values representing distinct attributes; and for each element of the plurality, determining a number of occurring matching values for each of a plurality of attributes.

5. The method of claim 1, wherein inferring, by a computer, occurrence of specific attributes in the formatted data and assigning, by a computer, most appropriate occurring values to the specific attributes is based at least upon at least one maintained datum concerning attributes from a group of data concerning attributes consisting of:

a set of matching values for each of a plurality of attributes;

a set of matching names for each of a plurality of attributes; and a number of matching values for each of a plurality of attributes.

6. The method of claim 1, further comprising:

storing, by a computer, at least one attribute inferred to occur in the data and an assigned value of said at least one attribute.

7. The method of claim 1, wherein the formatted data consists of a type of data from a group consisting of:

a web page;

a portable document format document;

a word processor document; and a multi-media object.

8. At least one computer-readable storage medium for extracting attribute values from formatted data, the computer-readable storage medium storing program code for:

maintaining an attribute repository containing information concerning a plurality of attributes, wherein an attribute comprises an entity to which is assigned one from a finite group of values, and wherein the information concerning each attribute comprises at least one matching attribute name and at least one matching value for that attribute;

parsing formatted data and creating a plurality of elements, each element representing a segment of the data, comprising a canonical representation of the data, independent of the data format, said canonical representation comprising a sequence at least of text elements, each text element representing a contiguous unit of text from said formatted data, wherein said canonical representation excludes non-substantive content;

scanning the elements of the plurality for occurrences of attribute values;

ranking, by a computer, each element based on how many distinct attributes occur in that element;

for each of a plurality of attributes, ranking, by a computer, each matching value for that attribute based on the highest ranking of an element in which that value occurs, and on an occurrence of that value in the same element as an occurrence of a matching name of that attribute;

for each of a plurality of values occurring that occur in the formatted data, inferring, by a computer, occurrence in the formatted data of the attribute for which that value has the highest ranking, and assigning that value to that attribute; and preparing a summary of the data, using at least one attribute inferred to occur in the data and an assigned value of said at least one attribute.

9. The computer-readable storage medium of claim 8 further storing: program code for analyzing at least some of the elements of the plurality in order to glean additional information concerning the formatted data.

10. The computer-readable storage medium of claim 9, wherein the program code for analyzing at least some of the elements of the plurality in order to glean additional information concerning the formatted data further comprises: program code for performing a series of analysis steps in an order, said performing involving output from an earlier analysis step being used as input to a later analysis step.

11. The computer-readable storage medium of claim 8, wherein the program code for calculating value occurrence distribution and frequency within the data further comprises program code for performing by at least one step from a group of steps consisting of:

for each value occurring in the data, determining a number of attributes for which the value comprises a match;

for each value occurring in the data, calculating a number of occurrences of the value in the data; for each element of the plurality, determining a number of occurring values, said value representing distinct attributes; and for each element of the plurality, determining a number of occurring matching values for each of a plurality of attributes.

12. The computer-readable storage medium of claim 8, wherein the program code for inferring occurrence of specific attributes in the formatted data and assigning most appropriate occurring values to the specific attributes is for inferring occurrence of specific attributes in the formatted data and assigning most appropriate occurring values to the specific attributes based at least upon at least one maintained datum concerning attributes from a group of data concerning attributes consisting of:
- a set of matching values for each of a plurality of attributes;
- a set of matching names for each of a plurality of attributes; and
- a number of matching values for each of a plurality of attributes.

13. The computer-readable storage medium of claim 8, further storing: program code for storing at least one attribute inferred to occur in the data and an assigned value of said at least one attribute.

14. A computer system for extracting attribute values from formatted data, the computer system comprising a physical computing device with a processor and a memory, said physical computing device being programmed to execute the following steps:
- maintaining an attribute repository containing information concerning a plurality of attributes, wherein an attribute comprises an entity to which is assigned one from a finite group of values, and wherein the information concerning each attribute comprises at least one matching attribute name and at least one matching value for that attribute;
- parsing formatted data and creating a plurality of elements, each element representing a segment of the data, comprising a canonical representation of the data, independent of the data format, said canonical representation comprising a sequence at least of text elements, each text element representing a contiguous unit of text, wherein said canonical representation excludes non-substantive content;
- scanning the elements of the plurality for occurrences of attribute values;
- ranking, by a computer, each element based on how many distinct attributes occur in that element;
- for each of a plurality of attributes, ranking, by a computer, each matching value for that attribute based on the highest ranking of an element in which that value occurs, and on an occurrence of that value in the same element as an occurrence of a matching name of that attribute;
- for each of a plurality of values occurring that occur in the formatted data, inferring, by a computer, occurrence in the formatted data of the attribute for which that value has the highest ranking, and assigning that value to that attribute; and
- preparing a summary of the data, using at least one attribute inferred to occur in the data and an assigned value of said at least one attribute.

15. The computer system of claim 14, wherein calculating value occurrence distribution and frequency within the data further comprises at least one step from a group of steps consisting of:
- for each value that occurs in the data, determining a number of attributes for which the value comprises a match;
- for each value occurring that occurs in the data, calculating a number of occurrences of the value in the data;
- for each element of the plurality, determining a number of occurring values, said values representing that represent distinct attributes; and
- for each element of the plurality, determining a number of occurring matching values for each of a plurality of attributes.

16. The computer system of claim 14, wherein inferring occurrence of specific attributes in the formatted data and assigning most appropriate occurring values to the specific attributes is based at least upon at least one maintained datum concerning attributes from a group of data concerning attributes consisting of:
- a set of matching values for each of a plurality of attributes;
- a set of matching names for each of a plurality of attributes; and
- a number of matching values for each of a plurality of attributes.

17. A computer system for extracting attribute values from formatted data, the computer system comprising:
- a processor;
- a memory;
- hardware means for maintaining an attribute repository containing information concerning a plurality of attributes, wherein an attribute comprises an entity to which is assigned one from a finite group of values, and wherein the information concerning each attribute comprises at least one matching attribute name and at least one matching value for that attribute;
- hardware means for parsing formatted data and creating a plurality of elements, each element representing a segment of the data, comprising a canonical representation of the data, independent of the data format, said canonical representation comprising a sequence at least of text elements, each text element representing a contiguous unit of text, wherein said canonical representation excludes non-substantive content;
- hardware means for scanning the elements of the plurality for occurrences of attribute values;
- hardware means for ranking, by a computer, each element based on how many distinct attributes occur in that element;
- hardware means for, for each of a plurality of attributes, ranking, by a computer, each matching value for that attribute based on the highest ranking of an element in which that value occurs, and on an occurrence of that value in the same element as an occurrence of a matching name of that attribute;
- hardware means for, for each of a plurality of values occurring that occur in the formatted data, inferring, by a computer, occurrence in the formatted data of the attribute for which that value has the highest ranking, and assigning that value to that attribute; and
- hardware means for preparing a summary of the data, using at least one attribute inferred to occur in the data and its an assigned value of said at least one attribute.

* * * * *

UNITED STATES PATENT AND TRADEMARK OFFICE
CERTIFICATE OF CORRECTION

PATENT NO. : 7,606,797 B2
APPLICATION NO. : 11/357289
DATED : October 20, 2009
INVENTOR(S) : Keiron McCammon and Manish Chandra It is certified that error appears in the above-identified patent and that said Letters Patent is hereby corrected as shown below:

Claim 1, col. 6, lines 56-58, replace "wherein an attribute comprises an entity for which any of a plurality of values to which is assigned one from a finite group of values"

with -- "wherein an attribute comprises an entity to which is assigned one from a finite group of values"

Signed and Sealed this

Twenty-sixth Day of January, 2010

David J. Kappos
*Director of the United States Patent and Trademark Office*